March 11, 1941.　　　G. C. LUDWIG　　　2,234,441
INSULATING GROMMET
Filed May 19, 1939
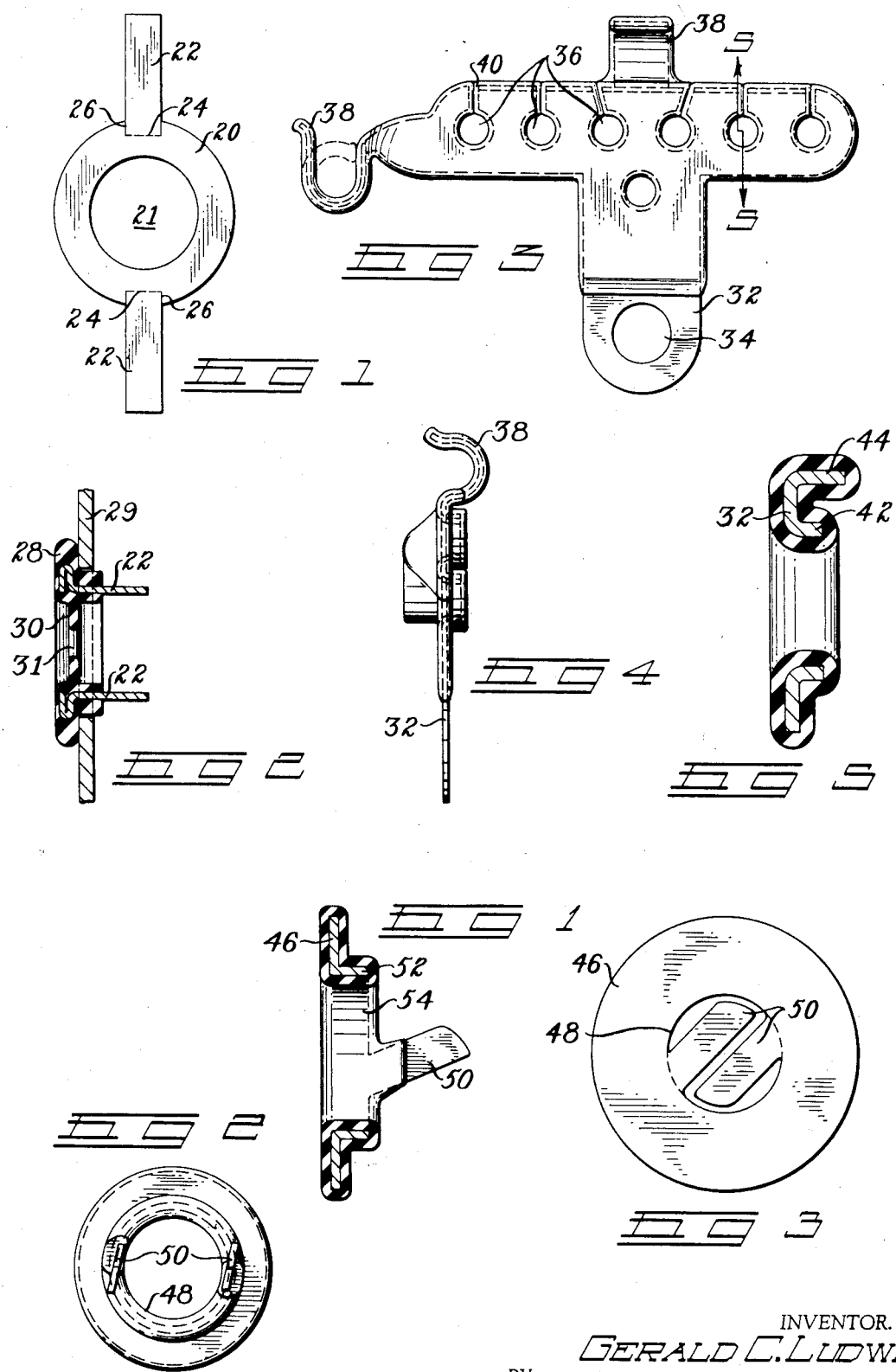
INVENTOR.
GERALD C. LUDWIG
BY
Parker & Burton
ATTORNEYS.

Patented Mar. 11, 1941

2,234,441

UNITED STATES PATENT OFFICE 2,234,441

INSULATING GROMMET

Gerald C. Ludwig, Detroit, Mich.

Application May 19, 1939, Serial No. 274,607

4 Claims. (Cl. 174—153)

My invention relates to an improved insulating grommet.

More particularly, an object is to provide an insulating grommet which comprises a metal insert having an aperture therethrough and covered with a rubber body which covers the margin of the aperture and forms a rubber wall thereabout adapted to serve as a yielding insulating support for an element extending through the aperture.

The metal insert may be formed of steel, brass, copper, or any other suitable metal capable of being drawn. Preferably the margin of the aperture is drawn angularly of the plane of the insert and axially of the aperture and the rubber body covers said drawn marginal portion to provide a relatively wide rubber wall adapted to support the element which extends through the aperture. The insert may be provided with prongs formed integrally therewith, which prongs may extend as projections from the margin of the aperture through the insert.

Grommets of this type are used in many places. One particular use is in connection with motor vehicles where such grommets may be used to provide a yielding insulating support for wires, cables, shafts, rods, or any other similar element. The cable or rod supported by the grommet may be adapted for movement through the grommet or it may be intended that such cable or rod be held stationary. In either event the improved grommet forms a tight seal about the element received therethrough and such element is yieldingly gripped by the grommet. The element is supported against chafing. It is electrically insulated and is insulated against noise, etc.

Other objects, advantages, and meritorious features of the invention will more fully appear from the following description, appended claims, and accompanying drawing, wherein:

Figure 1 is a plan of the grommet shown in Fig. 2,

Fig. 2 is a vertical sectional view through the grommet of Fig. 1, and

Fig. 3 is a plan of the insert which is used in the grommet structure of Figs. 1 and 2.

In the modification illustrated, the grommet comprises a metal insert of the character hereinafter described and provided with a rubber insulating body which covers the same.

In the construction shown in Figs. 1, 2 and 3 the insert is shown in plan in Fig. 3. This view shows the insert before the prongs are bent or the aperture margin drawn. The insert comprises an annular portion 46 apertured as at 48 and provided with prongs 50 formed integrally with the insert and extending from the margin of the aperture. The insert is drawn to the form shown in Fig. 2 with the margin of the aperture being bent angularly and axially as at 52. The insert is then covered with the rubber body 54. The end portions of the prongs are here shown as uncovered though they might be covered if desired and the prongs are disposed when the grommet is completely formed as shown in Figs. 1 and 2.

It will be seen that the element receiving aperture is provided with a relatively wide rubber covering wall adapted to support an element passed through the aperture and that the drawn portion of the margin of the aperture might readily be received through an opening in a supporting plate over which the prongs would be bent to hold the grommet in place. This insert is covered with a rubber body which may be molded thereon or a dipping operation might be carried out or any suitable method of providing a surrounding rubber covering might be employed. Any suitable element desired for support may be extended through the grommet aperture. It might be an electric wire or cable or rod or shaft or any other suitable structural part. The element may be movable through the aperture or supported stationary therein.

What I claim:

1. An insulating grommet comprising a metal insert having an aperture therethrough the margin of which is drawn axially with respect to the aperture, prongs formed integrally with the drawn margin of the aperture, a rubber body covering said insert and having an angular portion covering the drawn margin of the aperture.

2. An insulating grommet comprising a metal insert having an aperture therethrough the margin of which is drawn axially with respect to the aperture, prongs formed integrally with the drawn margin of the aperture and offset with respect to each other and extending into overlapping relationship, a rubber body covering said insert and having an angularly directed annular portion covering the drawn margin of the aperture.

3. An insulating grommet comprising a metal insert having an aperture therethrough and having two prongs extending from opposite sides of the aperture inwardly thereof on opposite sides of a diameter which extends substantially parallel to and between said prongs, the margin of the aperture being drawn axially with respect to said aperture substantially normal to the plane of that portion of the insert disposed outwardly beyond said drawn portion and a rubber body covering said insert including the drawn portion to which the prongs are attached.

4. An insulating grommet comprising a metal insert having an axial aperture, the margin of which is drawn at an angle substantially normal to the plane of the insert outwardly beyond said drawn portion, two prongs extending from opposite sides of said drawn portion in substantially the same direction as the drawn portion outwardly therebeyond a distance substantially as great as the radial dimension of the insert outwardly of the drawn portion and a rubber body covering said insert including the drawn portion.

GERALD C. LUDWIG.